(12) United States Patent
Bayer et al.

(10) Patent No.: US 6,726,734 B2
(45) Date of Patent: Apr. 27, 2004

(54) DEVICE FOR DEFLECTING DEBRIS FROM LAWNMOWER AIR INTAKE

(75) Inventors: Don R. Bayer, Dousman, WI (US); Gerald C. Ruehlow, Oconomowoc, WI (US)

(73) Assignee: Generac Power Systems, Inc., Waukesha, WI (US)

( * ) Notice: Subject to any disclaimer, the term of this patent is extended or adjusted under 35 U.S.C. 154(b) by 0 days.

(21) Appl. No.: 10/164,953

(22) Filed: Jun. 6, 2002

(65) Prior Publication Data

US 2003/0208997 A1 Nov. 13, 2003

Related U.S. Application Data

(63) Continuation-in-part of application No. 10/144,380, filed on May 13, 2002.
(51) Int. Cl.[7] ................................................ B01D 35/00
(52) U.S. Cl. ...................................... 55/297; 55/385.3
(58) Field of Search ............................... 55/297, 385.3, 55/467

(56) References Cited

U.S. PATENT DOCUMENTS

| | | | | |
|---|---|---|---|---|
| 3,155,473 A | * | 11/1964 | McNeil | ........................ 55/294 |
| 5,046,458 A | | 9/1991 | Kronich | .................... 123/41.63 |

* cited by examiner

*Primary Examiner*—Robert A. Hopkins
(74) *Attorney, Agent, or Firm*—Boyle Fredrickson Newholm Stein & Gratz S.C.

(57) ABSTRACT

An air intake screen is provided for deflecting foreign matter away from an air intake passageway of a lawnmower. The lawnmower includes an engine that draws air through the air intake passageway during the operation thereof. The air intake screen includes a central hub and a disc-shaped member projecting therefrom. The disc-shaped member terminates at an outer periphery and includes first and second sides. Apertures extend through the member for allowing for the flow of air therethrough. A deflection rib projects from the first side of a member to engage the debris carried by the air drawn towards the air intake passageway of the engine and deflects the debris away from the air intake screen.

20 Claims, 11 Drawing Sheets

DEVICE FOR DEFLECTING DEBRIS FROM LAWNMOWER AIR INTAKE

RELATED APPLICATION

This application is a continuation-in-part of U.S. patent application Ser. No. 10/144,380, which was filed May 13, 2002 and entitled "DEVICE FOR DEFLECTING DEBRIS FROM LAWNMOWER AIR INTAKE."

FIELD OF THE INVENTION

This invention relates generally to lawnmowers, and in particular, to a device for deflecting grass clippings and other debris from the air intake of a conventional lawnmower.

BACKGROUND AND SUMMARY OF THE INVENTION

Lawnmowers are available in a wide variety of configurations including manually operated and engine driven. Engine driven lawnmowers typically utilize an air cooled combustion engine having a crankshaft coupled to rotatable blades such that the crankshaft rotates the blades in response to operation of the engine. In order to dissipate the heat generated by the engine during operation, air is passed over the cylinders and the crankcase of the engine. To maximize the cooling effect, a fan or blower is incorporated in the flywheel of the engine and used to direct a cooling stream of air across the cylinders and other parts of the engine. In order to direct the cooling stream of air across the desired portions of the engine, an air intake port is provided.

It can be appreciated that during operation of the lawnmower, debris such as grass clippings, small leaves, dirt and other foreign matter may enter the air intake port and collect on the surface of the engine. The build-up of foreign matter on the engine decreases the effects of the cooling air stream on the engine. In fact, the build-up of foreign matter may insulate the engine from the air stream causing the possible overheating and premature wear of the engine.

In order to reduce the possibility of build-up of foreign matter on the engine, an air intake screen is often positioned over the air intake port of a lawnmower. The air intake screens may be fixed or operatively connected to the fan for rotational movement therewith. While on air intake screen decreases the build-up of foreign matter on the surface of the engine, foreign matter may still pass through the air intake screen and build-up on the surface of the engine. Hence, a simple and inexpensive device for further reducing the foreign matter that enters the air intake port of a conventional lawnmower is highly desirable.

Therefore, it is a primary object and feature of the present invention to provide a device for reducing the amount of foreign matter that passes into the air intake of a conventional lawnmower.

It is a further object and feature of the present invention to provide a device for reducing the amount of foreign matter that passes into the air intake of a conventional lawnmower that is simple to utilize and inexpensive to manufacture.

It is a still further object and feature of the present invention to provide a device for reducing the amount of foreign matter that passes into the air intake that may be incorporated for use with a plurality of prior lawnmowers.

In accordance with the present invention, a screen is provided for deflecting foreign matter from the inlet port of a rotary lawnmower having an engine. As is conventional, the engine draws air through the inlet port. The screen includes a central hub and a plurality of support ribs operatively connected to the central hub. The ribs define first and second sides of the screen. A deflection rib projects from the first side of the screen.

The first side of the screen terminates at an outer periphery. The first deflection rib has an outer end that terminates adjacent to outer periphery of the first side and an inner end that terminates adjacent to central hub. It is contemplated that the first deflection rib be generally arcuate. The screen may also include a second deflection rib that projects from the first side of the screen. The second deflection rib has an outer end that terminates adjacent the outer periphery of the first side and an inner end radially spaced from the central hub. Similar to the first deflection rib, the second deflection rib may be generally arcuate.

In accordance with a further aspect of the present invention, an improvement in the lawnmower having an engine and an air intake screen is provided. The air intake screen is positioned adjacent the engine to allow the engine to draw air through the air intake screen to cool the engine during the operation thereof. The air intake screen includes a central portion, a radially outer portion, first and second sides, and a plurality of apertures therethrough. The improvement includes a first deflection rib projecting from the first side of the air intake screen. A second deflection rib also projects from the first side of the air intake screen. The second deflection rib is positioned at a location circumferentially spaced from the first deflection rib.

The first and second deflection ribs have inner and outer ends and are generally arcuate. The inner ends of the deflection ribs are positioned adjacent to the central portion of the air intake screen and the outer ends of the deflection ribs are positioned adjacent to the outer portion of the air intake screen. A third deflection rib may project from the first side of the air intake screen at a location between the first and second deflection ribs. The third deflection rib has a terminal end adjacent the outer portion of the air intake screen and may be generally arcuate.

In accordance with a still further aspect of the present invention, an air intake screen is provided for deflecting foreign matter away from an air intake passageway of a lawnmower. The lawnmower includes an engine that draws air through the air intake passageway during the operation thereof. The air intake screen includes a central hub and a disc-shaped member projecting from the central hub. The member terminates at an outer periphery and includes first and second sides having apertures therebetween for allowing for the flow of air therethrough. A first deflection rib projects from the first side of the member.

The first deflection rib has an outer end that terminates adjacent the outer periphery of the member and an inner end that terminates adjacent the central hub. The first deflection rib may be generally arcuate. A second deflection rib may also project from the first side of the member. The second deflection rib includes an outer end that terminates adjacent the outer periphery of the member and an inner end radially spaced from the central hub. Similar to the first deflection rib, the second deflection rib may be generally arcuate.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
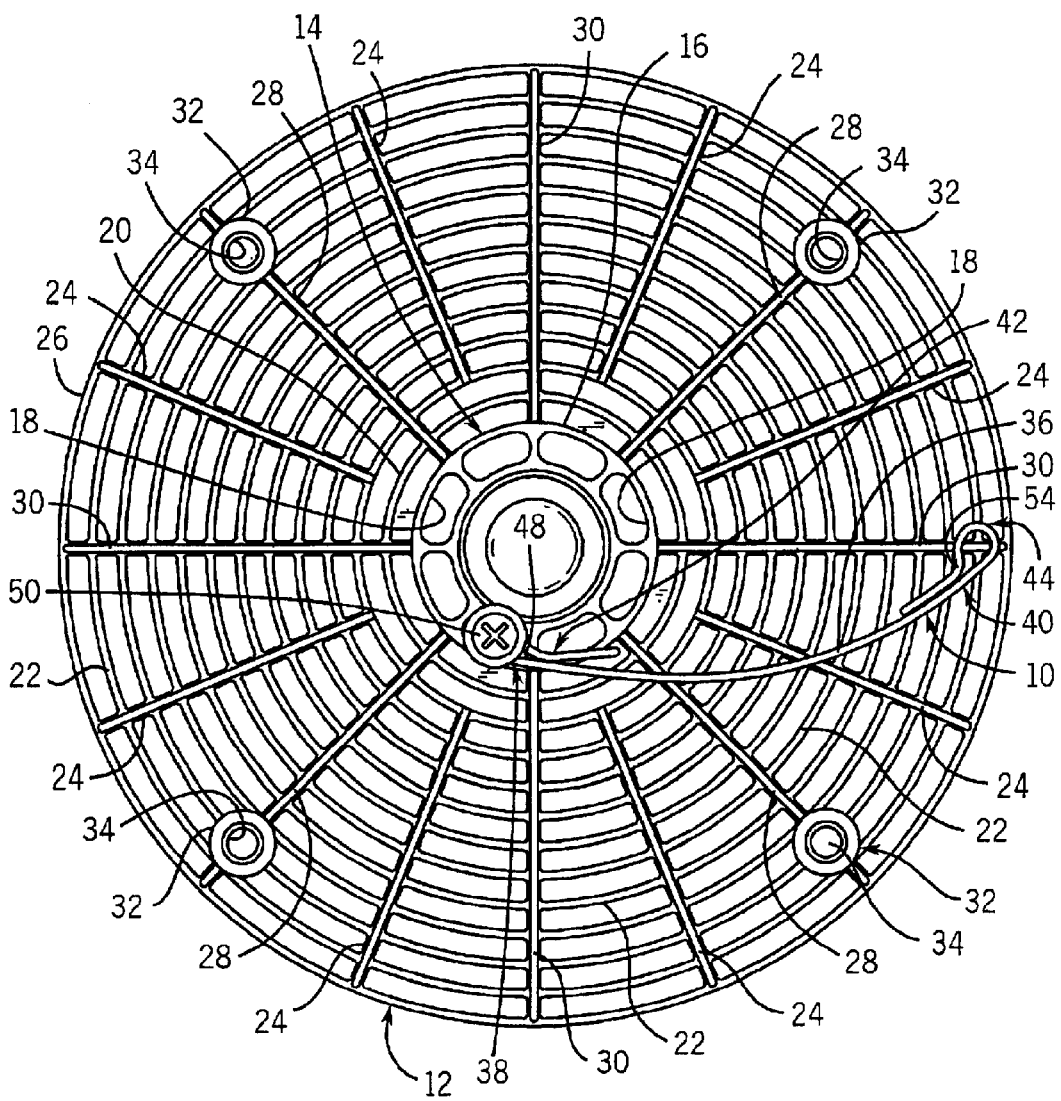
FIG. 1 is a top plan view of a first embodiment of a deflection member in accordance with the present invention mounted on an air intake screen of a lawnmower.
Figure 2:
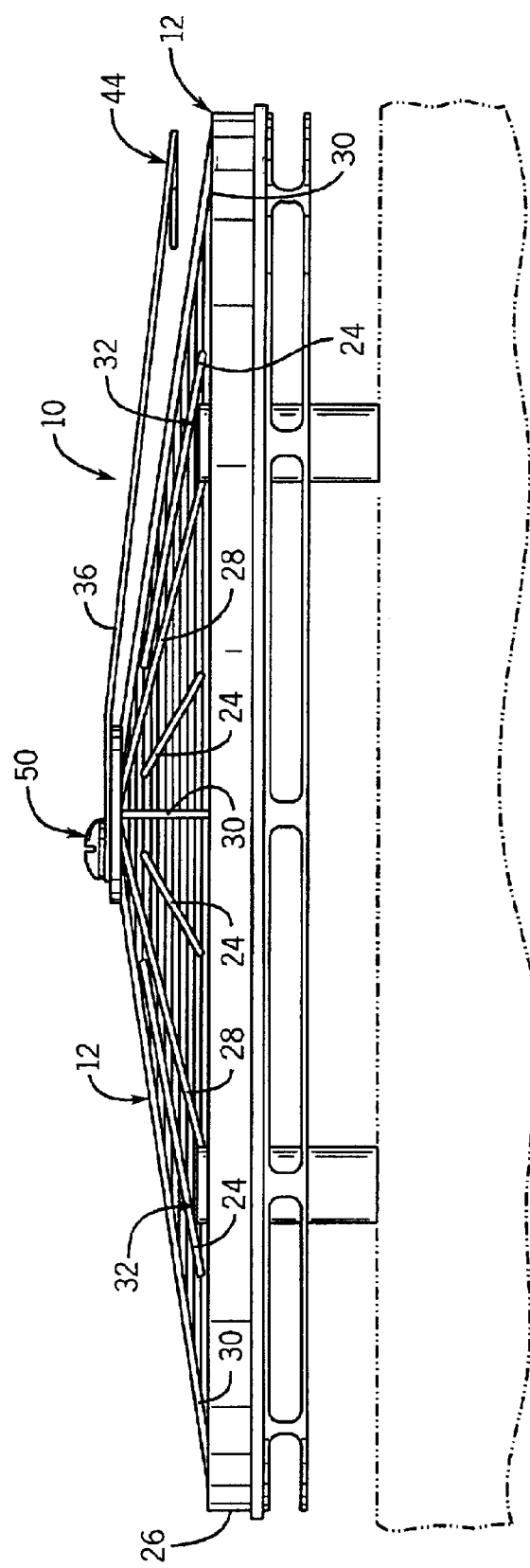
FIG. 2 is a side elevational view of the deflection member of FIG. 1 mounted on an air intake screen of a lawnmower.

Referring to FIGS. 1 and 2, a first embodiment of a deflection member in accordance with the present invention is generally designated by the reference numeral 10. It is intended that deflection member 10 be mounted on air intake screen 12 and that air intake screen 12 be placed over the air intake port of a conventional lawnmower. It is contemplated that air intake screen 12 be operatively connected to the flywheel of the engine of the lawnmower for rotational movement therewith. However, air intake screen 12 may be fixed to the lawnmower without deviating from the scope of the present invention.

Air intake screen 12 includes a generally disc-shaped central hub 14. Central hub 14 includes a radially outer edge 16 and a plurality of circumferentially spaced apertures 18 adjacent outer edge 16. Apertures 18 through central hub 14 of air intake screen 12 facilitate the mounting of deflection member 10 thereto, as hereinafter described. Air intake screen 12 further includes inner ring 20 which extends circumferentially about and is radially spaced from outer edge 16 of central hub 14. A series of concentric rings 22 are spaced along an axis extending radially from outer edge 16 of central hub 14. Rings 22 are interconnected by a plurality of radially extending spokes 24 that are circumferentially spaced about outer edge 16 of central hub 14. Rings 22 and spokes 24 define passageways for allowing ambient air to be drawn through air intake screen 12 into the air take port of the lawnmower.

Air intake screen 12 further includes a radially outer ring 26 extending about the outer periphery thereof. Outer edge 16 of central hub 14 and outer ring 26 are interconnected by a plurality of mounting spokes 28 and support spokes 30. Support spokes 30 are circumferentially spaced about outer edge 16 of central hub 14. Similarly, mounting spokes 28 are also circumferentially spaced about and extend radially from outer edge 16 of central hub 14. Mounting spokes 28 include mounting elements 32 formed therein. Mounting elements 32 in mounting spokes 28 include mounting apertures 34 therethrough to facilitate the mounting of air intake screen 12 to a lawnmower.

Deflection member 10 includes a generally arcuate deflection arm 36 having a radially inner end 38 and a radially outer end 40. Inner element 42 is interconnected to radially inner end 38 of deflection arm 36 and outer element 44 is interconnected to radially outer end 40 of deflection arm 36. Inner element 42 is folded back upon deflection arm 36 so as to define an opening 48. Screw 50 is provided to interconnected deflection member 10 to air intake screen 12. Screw 50 includes an enlarged head and a shaft that extends through opening 48 defined by inner element 42 and is threaded into a corresponding aperture 18 in central hub 14 of air intake screen 12. Outer element 44 is folded back onto deflection arm 36 so as to define an opening 54. As best seen in FIG. 2, outer end 40 of deflection arm 36 and outer element 44 interconnected thereto are vertically spaced from air intake screen 12.

In operation, the flywheel of the engine of the lawnmower rotates in a conventional manner so as to draw ambient air through air intake screen 12 and to direct a cooling stream of air across the cylinders and other parts of the engine. As heretofore described, air intake screen 12 is operatively connected to the flywheel of the engine for rotational movement therewith. It can be appreciated that the air drawn into the air intake port through air intake screen 12 may carry grass clippings and other debris therewith. It is intended that deflection arm 36 of deflection member 10 engage the grass clippings and other debris carried by the ambient air drawn into the air intake port through air intake screen 12 so as to deflect such grass clippings and other debris away from air intake screen 12. As a result, the quantity of grass clippings and other debris entering the air intake port of a conventional lawnmower through air intake screen 12 is reduced.

Figure 3:
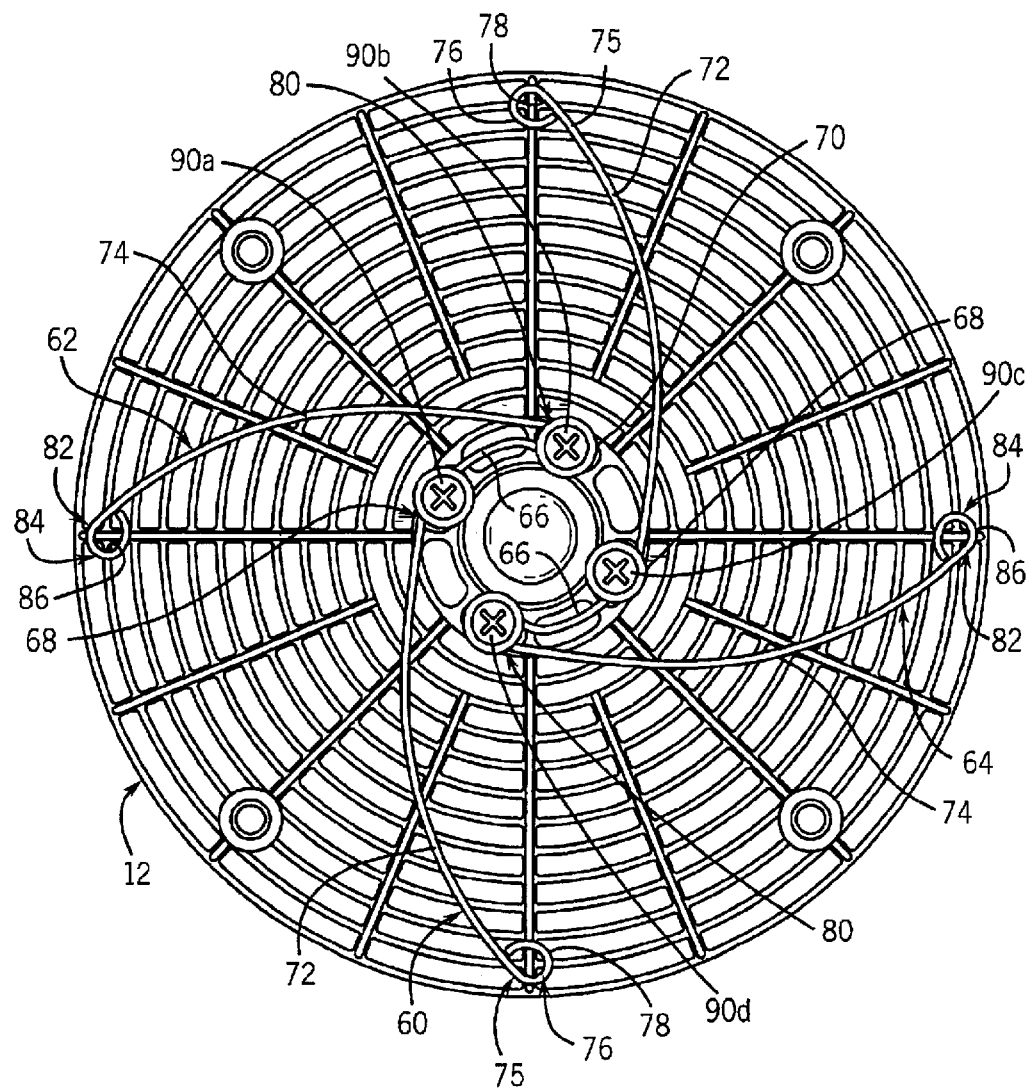
FIG. 3 is a top plan view of a second embodiment of a deflection member in accordance with the present invention mounted on an air intake screen of a lawnmower.
Figure 4:
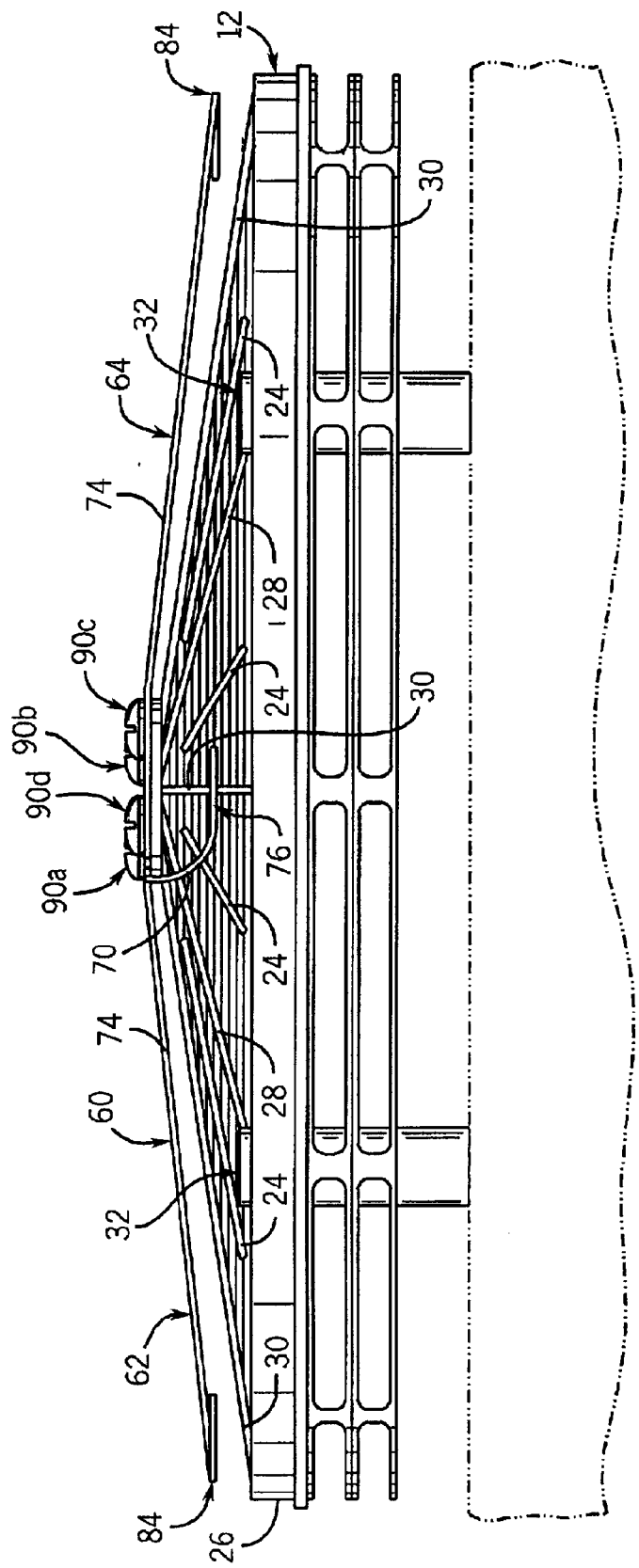
FIG. 4 is a side elevational view of the deflection member of FIG. 3 mounted on an air intake screen of a lawnmower.
Figure 5:
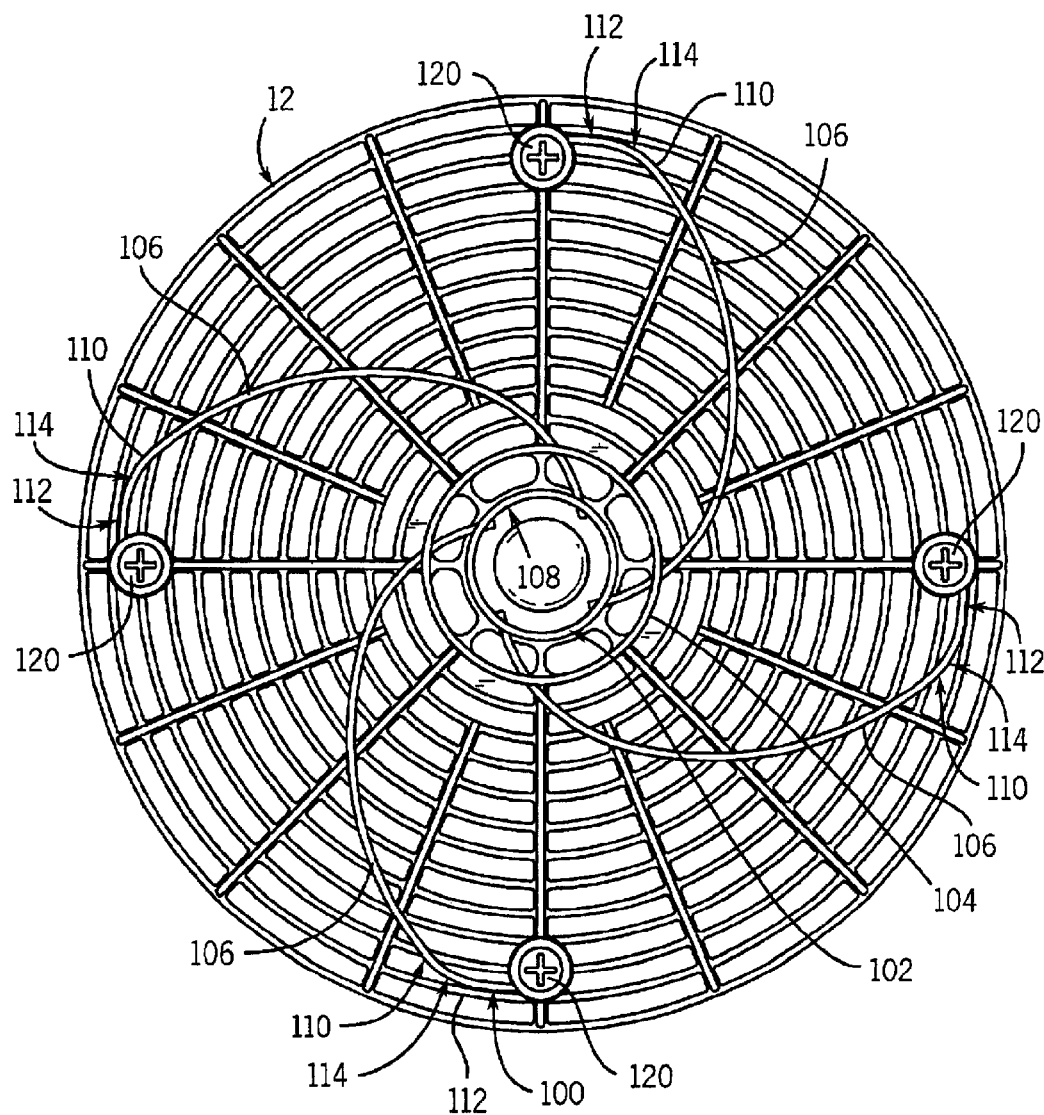
FIG. 5 is a top plan view of a third embodiment of a deflection member in accordance with the present invention mounted on an air intake screen of a lawnmower.
Figure 6:
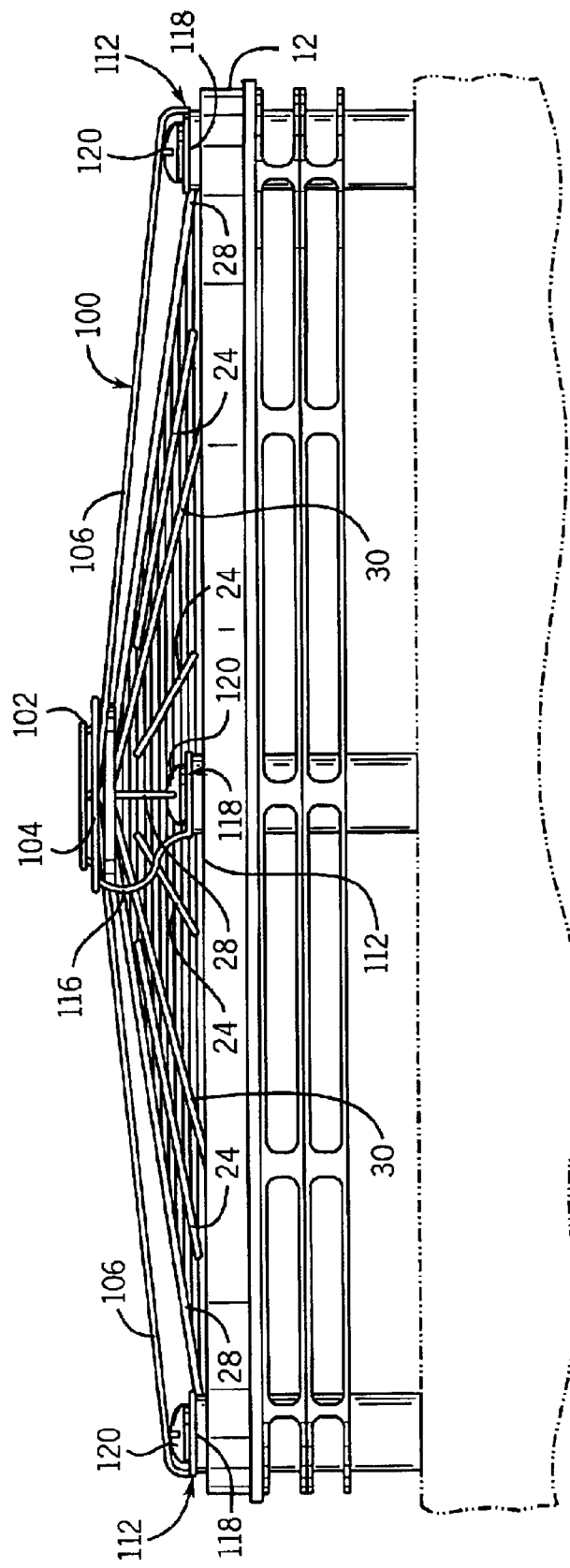
FIG. 6 is a side elevational view of the deflection member of FIG. 5 mounted on an air intake screen of a lawnmower.

Referring to FIGS. 3 and 4, a second embodiment of a deflection member in accordance with the present invention is generally designated by the reference numeral 60. It is intended that deflection member 60 be mounted to air intake screen 12 that is operatively connected to the flywheel of the engine of a conventional lawnmower, as heretofore described. Deflection member 60 includes first and second deflection elements 62 and 64, respectively. Deflection elements 62 and 64 are identical in structure, and as such, the description hereinafter of deflection element 62 is understood to describe deflection element 64 as fully described hereinafter.

Deflection element 62 includes central portion 66 having first and second ends 68 and 70, respectively. First and second, generally arcuate deflection arms 72 and 74, respectively, extend from corresponding ends 68 and 70 of central portion 66 of deflection element 62. First deflection arm 72 terminates at a radially outer end 75 having outer element 76 interconnected thereto. Outer element 76 is folded back onto outer end 75 of first deflection arm 72 so as to define an opening 78.

Second deflection arm 74 extends from second end 70 of central portion 66 of deflection element 62. Second deflection arm 74 includes radially inner end 80 that is in close proximity to central portion 66 of deflection element 62 and radially outer end 82 having outer element 84 interconnected thereto. Outer element 84 is folded back onto outer end 82 of second deflection arm 74 of deflection element 62 so as to define opening 86.

Screws 90a–90d interconnect deflection member 60 to air intake screen 12. Screw 90a includes an enlarged head and a shaft inserted into the corresponding aperture 18 in central hub 14 of air intake screen 12 so as to capture first end 68 of central portion 66 of deflection element 62 between air intake screen 12 and the head of screw 90a. Screw 90b includes an enlarged head and a shaft extending between inner end 80 of second deflection arm 74 of deflection element 62 and central portion 66 of deflection element 62 into a corresponding aperture 18 in central hub 14 of air intake screen 12 so as to capture inner end 80 of second deflection arm 74 of deflection element 62 between air intake screen 12 and the head of screw 90b. Screw 90c includes an enlarged head and a shaft threaded into a corresponding aperture 18 in central hub 14 of air intake screen 12 so as to capture the first end 68 of central portion 66 of deflection element 64 between air intake screen 12 and the head of screw 90c. Screw 90d includes an enlarged head and a shaft extending between central portion 66 of deflection element 64 and inner end 80 of second deflection arm 74 of deflection element 64 into a corresponding aperture 18 and central hub 14 of air intake screen 12 so as to capture second deflection arm 74 between air intake screen 12 and the head of screw 90d.

In operation, as heretofore described, air intake screen 12 is operatively connected to the flywheel of the engine for rotational movement therewith. It is intended that first and second deflection arms 72 and 74, respectively, of deflection elements 62 and 64 of deflection member 60 engage the grass clippings and other debris carried by the air drawn into the air intake port through air intake screen 12 so as to deflect such grass clippings and debris away from air intake screen 12. As a result, the quantity of the grass clippings and other debris entering the air intake portion of a conventional lawnmower through air intake screen 12 is reduced.

Referring to 5 and 6, a third embodiment of a deflection member in accordance with the present invention is generally designated by the reference numeral 100. It is intended that deflection member 100 be mounted on air intake screen 12 that is operatively connected to the flywheel of the engine of the conventional lawnmower, as heretofore described. Deflection member 100 includes inner and outer, radially spaced, concentric rings 102 and 104, respectively, interconnected by a purality of deflection arms 106. Each deflection arm 106 is generally arcuate in shape and includes a radially inner end interconnected to inner ring 102. In addition, each deflection arm 106 is also interconnected to outer ring 104.

Deflection member 100 further includes outer elements 112 extending circumferentially from corresponding outer ends 110 of deflection arms 106 such that outer elements extend about inner and outer rings 102 and 104, respectfully. Each outer element 112 includes a first end 114 interconnected to outer end 110 of a corresponding deflection arm 106 and a second end 118 folded onto itself to define an opening. Screws 120 are provided to interconnect deflection number 100 to air intake screen 12. Screw 120 include enlarged heads and shafts that extend through corresponding openings defined by second ends 118 of outer elements 112 into mounting apertures 34 in mounting elements 32 of corresponding mounting spokes 28 of air intake screen 12.

As heretofore described, air intake screen 12 is operatively connected to the flywheel of the engine of a conventional lawnmower for rotational movement therewith. It is intended that deflection arms 106 engage any grass clippings or other debris carried by the air drawn into the air intake port through air intake screen 12 so as to deflect such grass clippings and other debris away from air intake screen 12. As a result, the quantity of grass clippings and other debris entering the air intake port of the lawnmower through air intake screen 12 is reduced.

Figure 7:
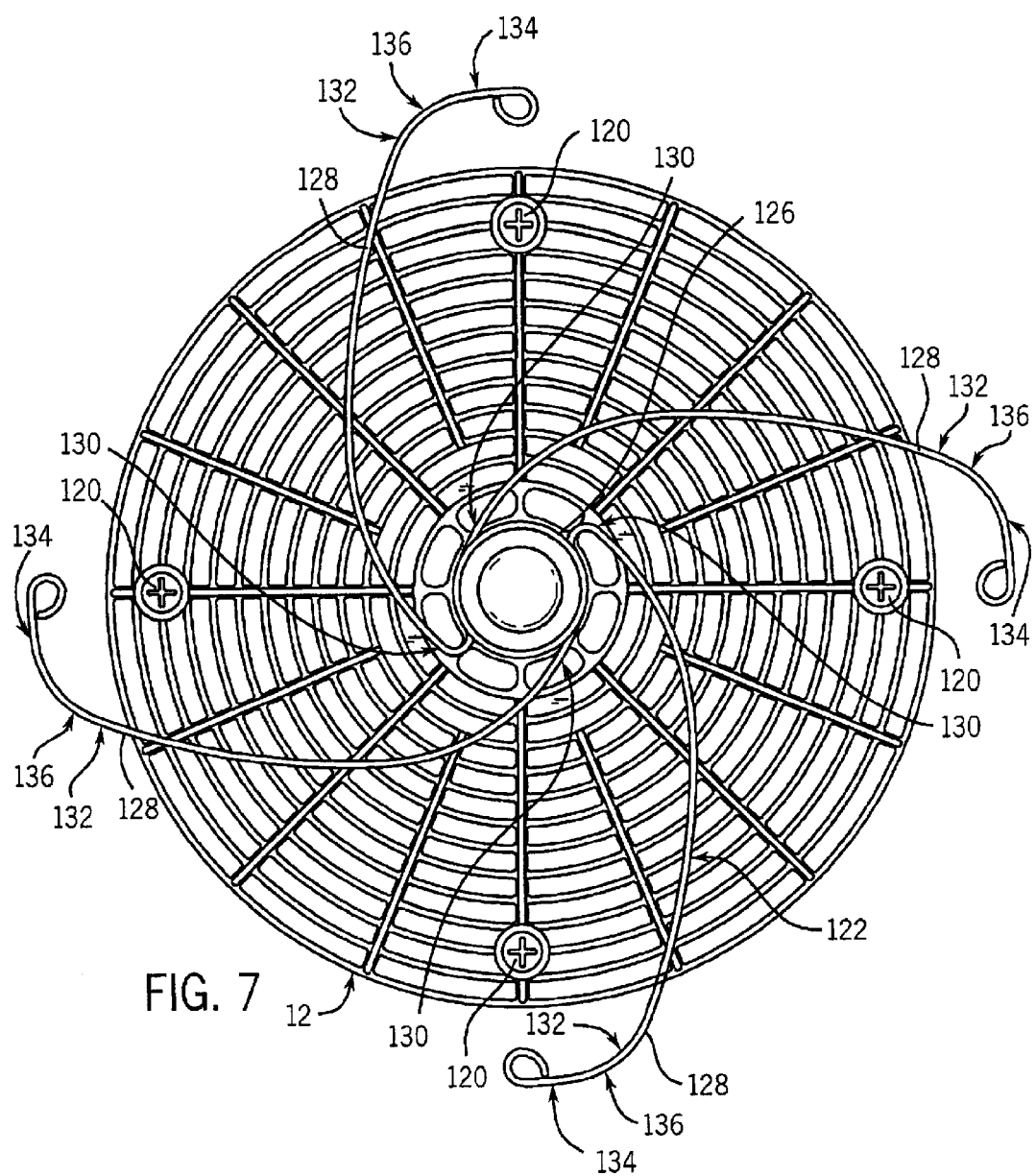
FIG. 7 is a top plan view of a fourth embodiment of a deflection member mounted on a housing about an air intake screen of a lawnmower.
Figure 8:
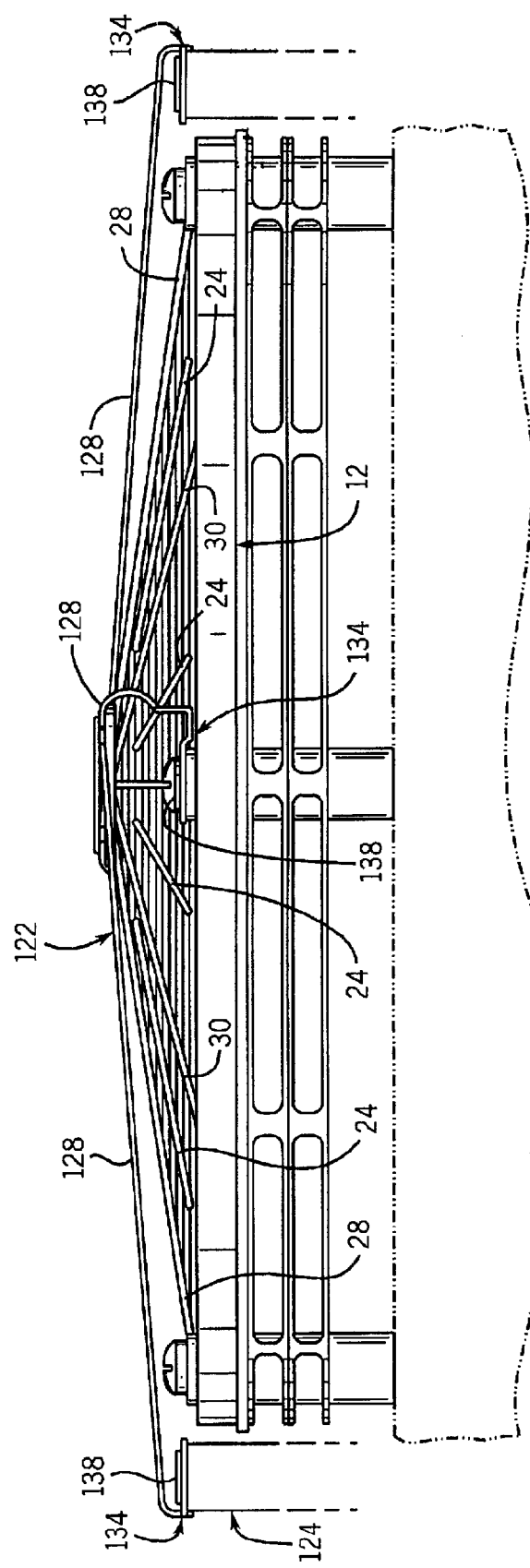
FIG. 8 is a side elevational view of the deflection member of FIG. 7 mounted on a housing about an air intake screen of a lawnmower.

Referring to FIGS. 7 and 8, a fourth embodiment of a deflection member in accordance with the present invention is generally designated by the reference numeral 122. It is intended that deflection member 122 be mounted on housing 124 extending about the outer periphery of air intake screen 12. Deflection member 122 includes a central ring 126 positioned over central hub 14 of air intake screen 12. Generally arcuate deflection arms 128 extend radially from central ring 126. Deflection arms 128 include radially inner ends 130 interconnected to central ring 126 and radially outer ends 132. Radially inner ends 130 of deflection arms 128 are circumferentially spaced about central ring 126.

Outer elements 134 extends circumferentially about central ring 126 of deflection member 122. Outer elements 134 include first ends 136 interconnected to radially outer ends 132 of corresponding deflection arms 128 and second ends folded back onto themselves so as to define openings. Screws 138 are provided to interconnect deflection member 122 to housing 124. Screws 138 include enlarged heads and shafts extending through the openings defined by second ends 136 of corresponding outer elements 134 into corresponding apertures in housing 124.

As heretofore described, air intake screen 12 is operatively connected to the flywheel of the engine of a conventional lawnmower for rotational movement therewith. It is intended that grass clippings and other debris carried by the air drawn through air intake screen 12 engage deflection arms 128 of deflection member 122 such that the deflection arms 128 deflect such grass clippings and other debris away from air intake screen 12. As a result, the quantity of grass clippings and other debris entering the air intake port of a conventional lawnmower through air intake screen 12 is reduced.

Figure 9:
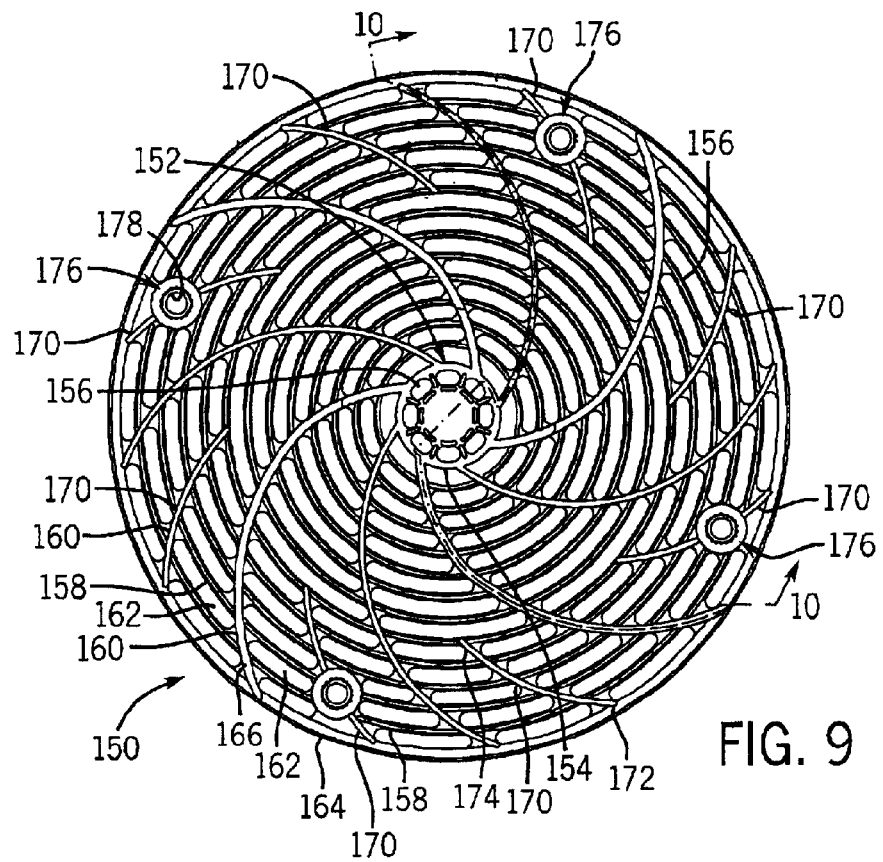
FIG. 9 is a top plan view of an air intake screen of a lawnmower in accordance with the present invention.
Figure 10:
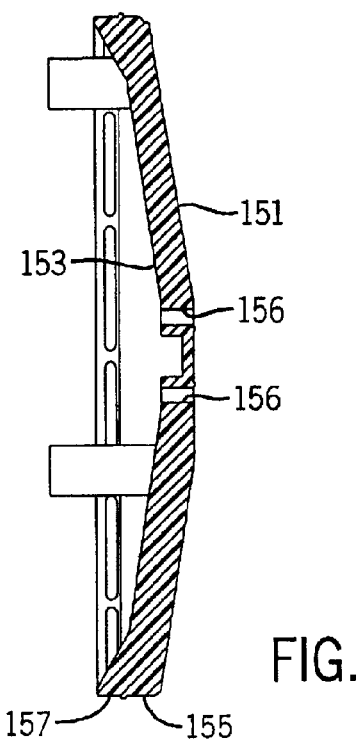
FIG. 10 is a side elevational view of the air intake screen of FIG. 9 mounted on the lawnmower.
Figure 11:
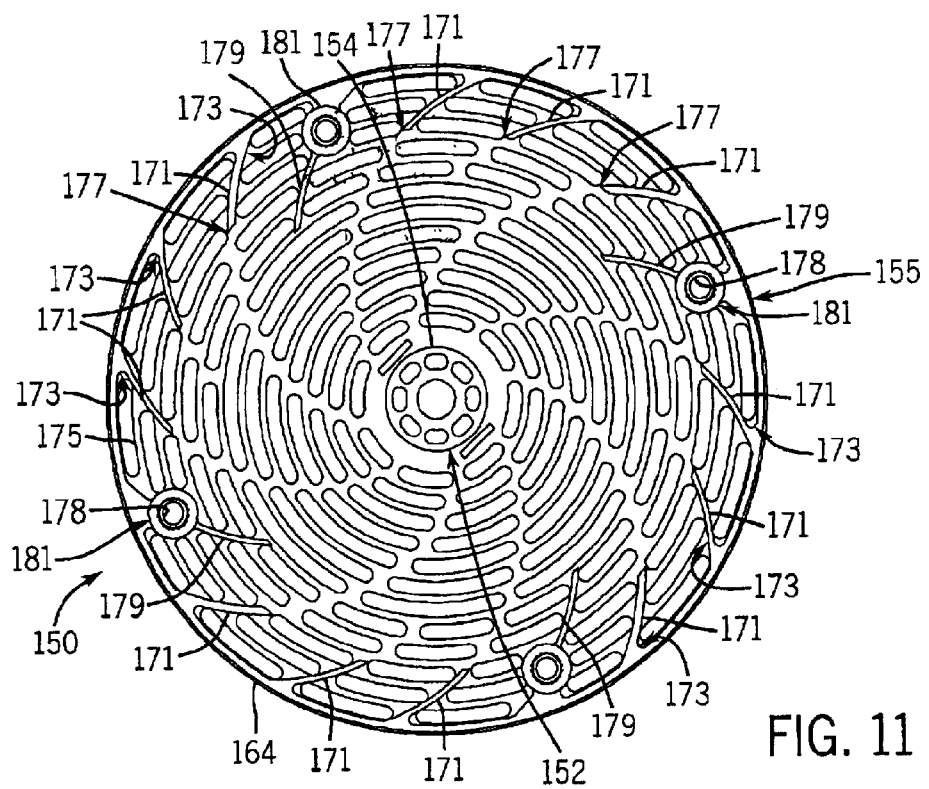
FIG. 11 is a bottom plan view of the air intake screen of FIG. 9.

Referring to FIGS. 9–11, an alternate embodiment of an air intake screen is generally designated by the reference numeral 150. It is intended that air intake screen 150 be placed over the air intake port of a conventional lawnmower. As hereinafter described, air intake screen 150 is operatively connected to the flywheel of the engine of the lawnmower for rotational movement therewith.

Air intake screen 150 includes a generally circular central hub 152 having a radially outer edge 154 and a plurality of circumferentially spaced apertures 156 that are adjacent outer edge 154. Air intake screen 150 further includes a generally disc-shaped screening member 155 projecting radially from outer edge 154 of central hub 152 and terminating at outer periphery 117. Screening member 155 is formed by a plurality of concentric rings 158 that are spaced along an axis extending radially from outer edge 154 of central hub 152. Adjacent rings 158 are interconnected by a plurality of circumferentially spaced connection elements 160 so as to define passageways 162 through screening member 155 of air intake screen 150 therebetween.

Outer ring 164 extends about the outer periphery 157 of screening member 155. Outer ring 164 and outer edge 154 of central hub 152 are interconnected by a plurality of deflection ribs 166 that project from first side 151 of screen member 155. Deflection ribs 166 are generally arcuate in shape and circumferentially spaced about central hub 152. In addition, a plurality of secondary deflection ribs 170 project from first side 151 of screening member 155. Each secondary deflection rib 170 is disposed between a corresponding pair of deflection ribs 166 projecting from first side 151 of screening member 155. Secondary deflection ribs 170 include radially outer ends 172 operatively connected to outer ring 164 of screening member 155 and radially inner ends 174 radially spaced from outer edge 154 of central hub 152. It is contemplated to provide mounting elements 176 in alternate secondary deflection ribs 170. Mounting elements 176 in secondary deflection ribs 170 partially define corresponding mounting apertures 178 therethrough to facilitate the mounting of air intake screen 150 to the flywheel of a lawnmower.

As best seen in FIG. 11, a plurality of strengthening ribs 171 project from second side 153 of screen member 155. Strengthening ribs 171 include radially outer ends 173 operatively connected to outer ring 164 of screening member 155 and radially inner ends 177 radially spaced from outer edge 154 of central hub 152. In addition, a plurality of mounting ribs 179 project from second side 153 of screening member 155. Mounting ribs 179 are aligned with corresponding secondary deflection ribs 170 projecting from first side 151 of screen member 155 and include mounting elements 181 that partially define corresponding mounting apertures 178 therethrough, for reasons heretofore described.

In operation, the flywheel of the engine lawnmower rotates in a conventional manner so as to draw ambient air through air intake screen 150 and direct the cooling stream of air across the cylinders and other parts of the engine. As heretofore described, air intake screen 150 is operatively connected to the flywheel of the engine for rotational movement therewith. It is intended that deflection ribs 166 and secondary deflection ribs 170 projecting from first side 151 of screening member 155 engage the grass clippings and other debris carried by the ambient air drawn into the air intake port by the engine of the lawnmower so as to deflect such grass clippings and other debris away from air intake screen 150. As a result, the quantity of grass clippings and other debris entering the air intake port of a conventional lawnmower through air intake screen 150 is reduced.

Figure 12:
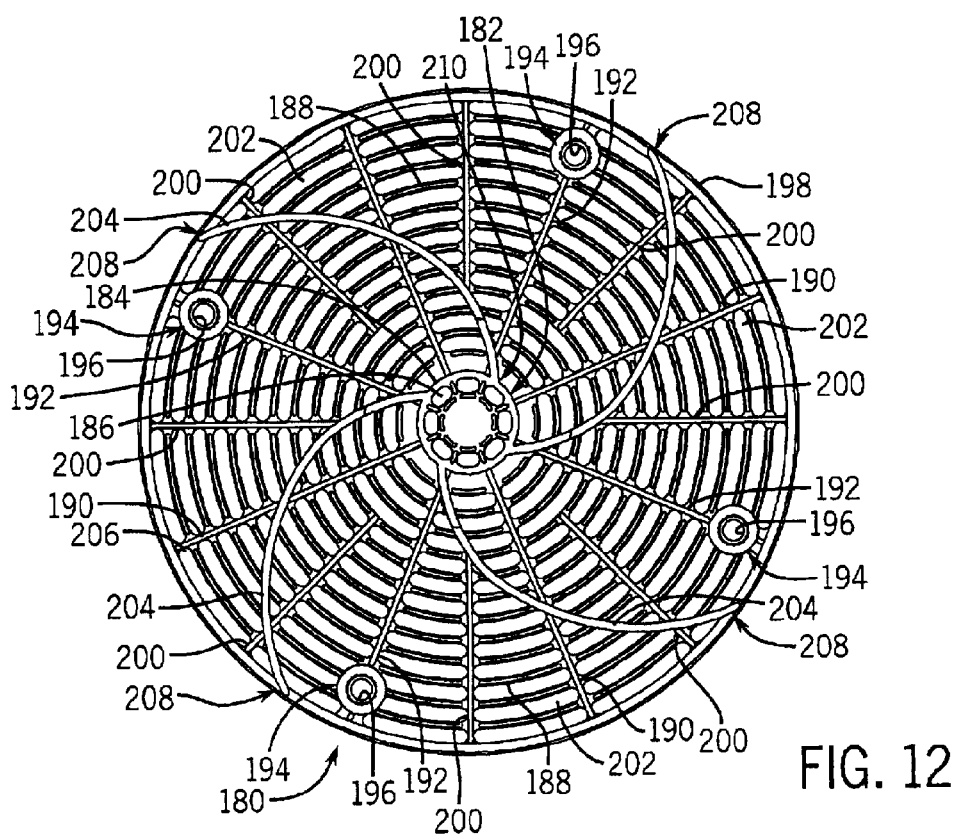
FIG. 12 is a top plan view of a second embodiment of an air intake screen of a lawnmower in accordance with the present invention.
Figure 13:
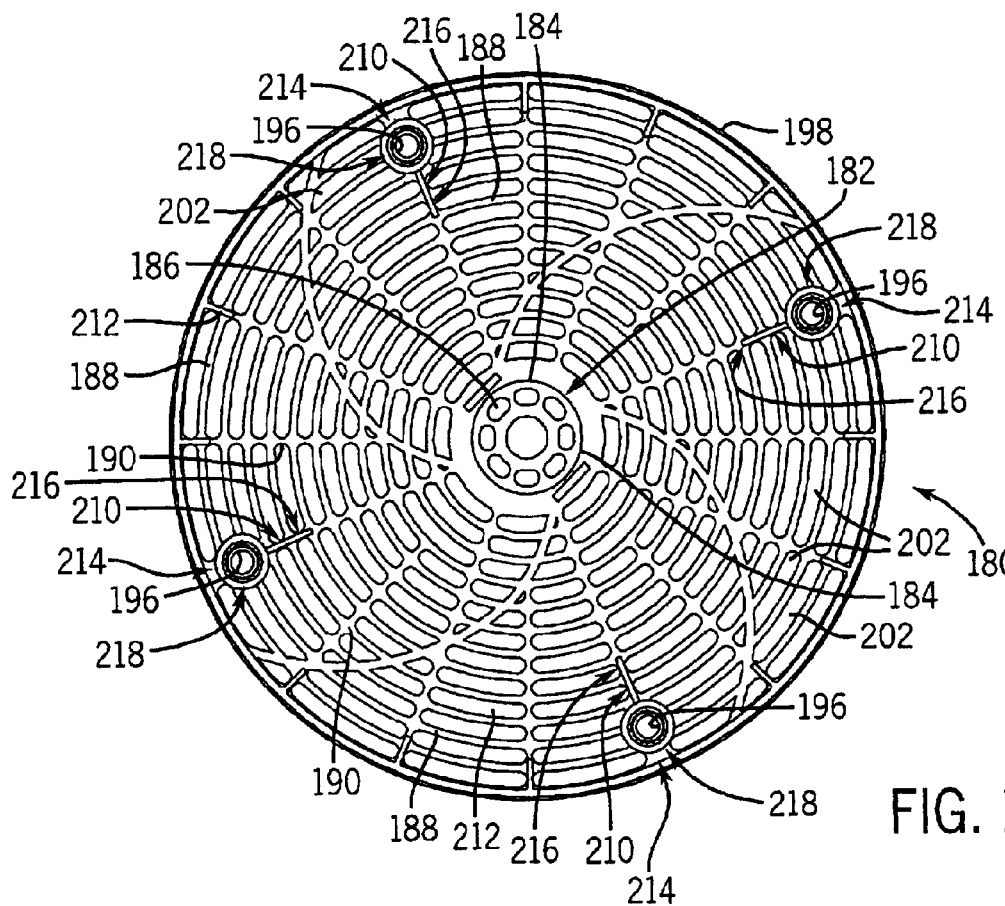
FIG. 13 is a bottom plan view of the air intake screen of FIG. 12.

Referring to FIGS. 12 and 13, a still further embodiment of an air intake screen in accordance with the present invention is generally designated by the reference numeral 180. It is intended that air intake screen 180 be operatively connected to the flywheel of the engine of a conventional lawnmower, as heretofore described. Air intake screen 180 includes a generally circular central hub 182 having a radially outer edge 184 and a plurality of circumferentially spaced apertures 186 that are adjacent to outer edge 184.

Air intake screen 180 further includes a series of concentric rings 188 spaced along an axis extending radially from outer edge 184 of central hub 182. Rings 188 are interconnected by a plurality of radially extending spokes 190 that are circumferentially spaced about outer edge 184 of central hub 182. In addition, air intake screen 180 includes a plurality of mounting spokes 192 that are circumferentially about outer edge 184 of central hub 182. Mounting spokes 192 include mounting elements 194 formed therein. Mounting elements 194 in mounting spokes 192 partially define corresponding mounting apertures 196 therethrough to facilitate the mounting of air intake screen 180 to the flywheel of a lawnmower. Mounting spokes 192 and spokes 190 extend between outer edge 184 of central hub 192 and outer ring 198 extending about the outer periphery of air intake screen 180.

Air intake screen 180 further includes a plurality of support spokes 200 that extend radially inward from outer ring 198. Each support spoke 200 is disposed between a corresponding one of the plurality of spokes 190 and a corresponding one of the plurality of mounting spokes 192. It can be appreciated that rings 188, spokes 190, mounting spokes 192 and support spokes 200 define passageways 202 through air intake screen 180 for allowing ambient air to be drawn through air intake screen 180 into the air intake port of the lawnmower.

Deflection ribs 204 project from first side 206 of air intake screen 180. Deflection ribs 204 are generally arcuate in shape and include radially outer ends 208 operatively connected to outer ring 198 of air intake screen 180 and a radially inner end 210 operatively connected to radially outer edge 194 of central hub 182. Deflection ribs 204 are circumferentially spaced about outer edge 184 of central hub 182.

As best seen in FIG. 12, strengthening ribs project from second side 212 of air intake screen 180. Strengthening ribs 210 are circumferentially spaced about central hub 182 and include radially outer ends 214 operatively connected to outer ring 198 of air intake screen 180 and radially inner ends 216 radially spaced from outer edge 184 of central hub 182. Mounting elements 218 are provided in strengthening ribs 210. Mounting elements 218 partially define corresponding mounting apertures 196 to facilitate the mounting of air intake screen 182 of flywheel of a lawnmower, as heretofore described.

In operation, air intake screen 180 is operatively connected to the flywheel of the engine for rotational movement therewith. It can be appreciated that as the air drawn into the air intake port through air intake screen 180 may carry grass clippings and other debris therewith. It is intended that deflection ribs 204 extending from first side 206 of air intake screen 180 engage the grass clippings and other debris carried by the ambient air drawn into the air intake port through air intake screen 180 so as to deflect such grass clippings and other debris away from air intake screen 180. As a result, the quantity of grass clippings and other debris entering the air intake port of a conventional lawnmower through air intake screen 180 is reduced.

Various modes of carrying out the invention are contemplated as being within the scope of the following claims particularly pointing out and distinctly claiming the subject matter that is regarded as the invention.

We claim:

1. A screen for deflecting foreign matter from the inlet port of a rotary lawnmower having an engine, the engine drawing air through the inlet port, the screen comprising:
   a central hub;
   a plurality of support ribs operatively connected to the central hub, the ribs defining first and second sides of the screen; and
   a first deflection rib projecting from the first side of the screen.

2. The screen of claim 1 wherein the first deflection rib is generally arcuate.

3. The screen of claim 1 wherein the first side terminates at an outer periphery and wherein the first deflection rib has an outer end that terminates adjacent the outer periphery of the first side.

4. The screen of claim 3 wherein the first deflection rib includes an inner end that terminates adjacent the central hub.

5. The screen of claim 1 wherein the first side terminates at an outer periphery and wherein the screen further comprises a second deflection rib projecting from the first side of the screen.

6. The screen of claim 5 wherein the second deflection rib has an outer end that terminates adjacent the outer periphery of the first side and an inner end radially spaced from the central hub.

7. The screen of claim 6 wherein the second deflection rib is generally arcuate.

8. The screen of claim 1 wherein the support ribs include a plurality of generally circular, concentric ribs radially spaced from the central hub.

9. In a lawnmower having an engine and an air intake screen adjacent the engine to allow the engine drawing air through the air intake screen to cool the engine during the operation thereof, the air intake screen having a central portion, a radially outer portion, first and second sides, and a plurality of apertures therethrough, the improvement comprising:
   a first deflection rib projecting from the first side of the air intake screen; and
   a second deflection rib projecting from the first side of the air intake screen at a location circumferentially spaced from the first deflection rib.

10. The improvement of claim 9 wherein the first and second deflection ribs have inner and outer ends and are generally arcuate.

11. The improvement of claim 10 wherein the inner ends of the deflection ribs are positioned adjacent the central portion of the air intake screen and the outer ends of the deflection ribs are positioned adjacent the outer portion of the air intake screen.

12. The improvement of claim 9 further comprising a third deflection rib projecting from the first side of the air intake screen at a location between the first and second deflection ribs.

13. The improvement of claim 12 wherein the third deflection rib has a terminal end adjacent the outer portion of the air intake screen.

14. The improvement of claim 13 wherein the third deflection rib is generally arcuate.

15. An air intake screen for deflecting foreign matter away from an air intake passageway of a lawnmower, the lawnmower including an engine that draws air though the air intake passageway during the operation thereof, comprising:
   a central hub;
   a disc-shaped member projecting from the central hub and terminating at an outer periphery, the member having first and second sides and apertures therebetween for allowing for the flow of air therethrough; and
   a first deflection rib projecting from the first side of the member, the first deflection rib being generally arcuate.

16. The air intake screen of claim 15 wherein the first deflection rib has an outer end that terminates adjacent the outer periphery of the member.

17. The air intake screen of claim 15 wherein the first deflection rib includes an inner end that terminates adjacent the central hub.

18. An air intake screen for deflecting foreign matter away from an air intake passageway of a lawnmower, the lawnmower including an engine that draws air though the air intake passageway during the operation thereof, comprising:
   a central hub;
   a disc-shaped member projecting from the central hub and terminating at an outer periphery, the member having first and second sides and apertures therebetween for allowing for the flow of air therethrough;
   a first deflection rib projecting from the first side of the member; and
   a second deflection rib projecting from the first side of the member.

19. The air intake screen of claim 18 wherein the second deflection rib has an outer end that terminates adjacent the outer periphery of the member and an inner end radially spaced from the central hub.

20. The air intake screen of claim 18 wherein the second deflection rib is generally arcuate.

* * * * *